(No Model.)

J. R. HOWGATE.
LATHE CHUCK.

No. 503,374.                                    Patented Aug. 15, 1893.

Witnesses,
Sidney P. Hollingsworth
Milton O'Connell

Inventor;
James R. Howgate
by his attorneys
Baldwin Davidson & Wight

UNITED STATES PATENT OFFICE.

JAMES R. HOWGATE, OF SCHENECTADY, NEW YORK.

LATHE-CHUCK.

SPECIFICATION forming part of Letters Patent No. 503,374, dated August 15, 1893.

Application filed May 9, 1893. Serial No. 473,607. (No model.)

*To all whom it may concern:*

Be it known that I, JAMES R. HOWGATE, a citizen of the United States, residing at Schenectady, in the county of Schenectady and State of New York, have invented certain new and useful Improvements in Lathe-Chucks, of which the following is a specification.

My invention relates to the class of "combination" lathe chucks, which are provided with devices for moving its center out of line with the center of the lathe to assume various degrees of eccentricity to facilitate in turning eccentrics for engines, pumps, and the like.

My invention consists in providing a lathe chuck with an adjustable taper pin, an expansible bushing, and an improved holder adapted to be secured to the eccentric blank.

The details of construction of my invention, and the subject-matter claimed are hereinafter designated.

Figure 1:
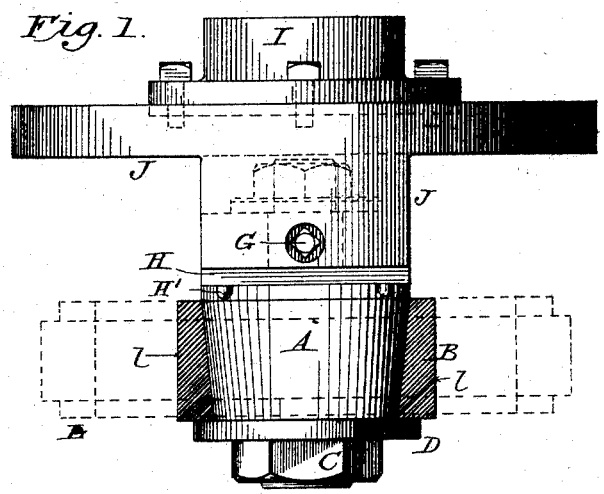
Figure 2:
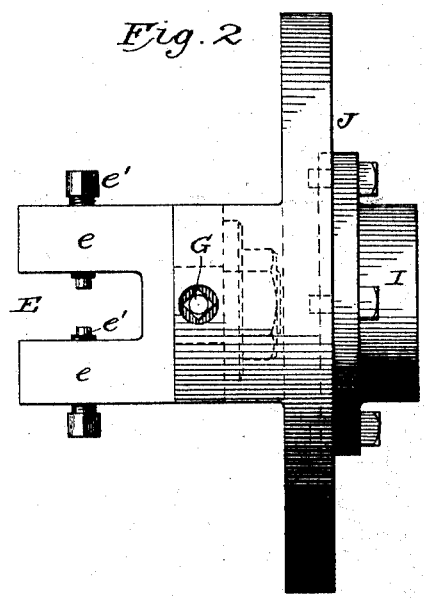
Figure 3:
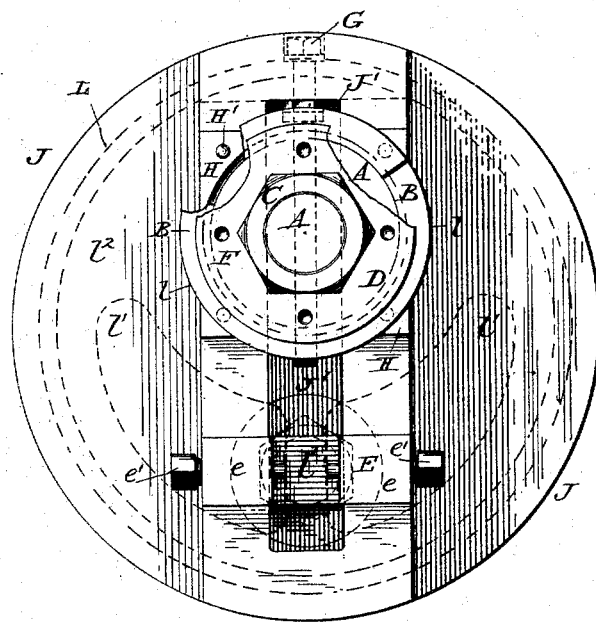
Figure 4:
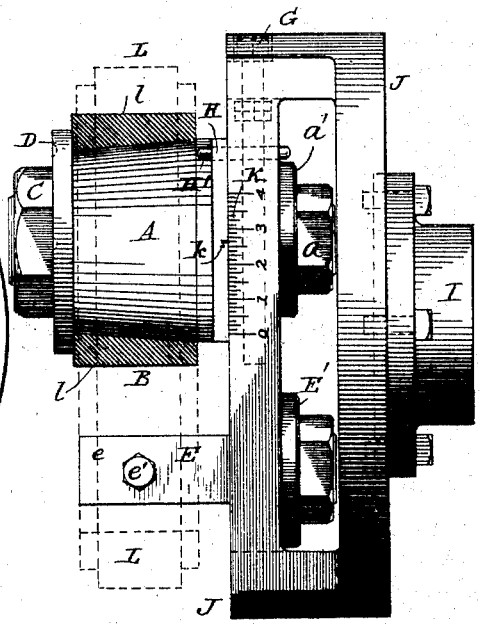

In the accompanying drawings,—Figure 1 is a top plan view of my improved chuck with the bushing in section. Fig. 2 is a similar view with the taper pin, bushing and the parts connected therewith removed. Fig. 3 is a front elevation, and Fig. 4 is a side elevation, partly in section.

The face plate I, may be of any suitable construction, and is adapted to be secured to a lathe. It is provided with a frame J, slotted at J' to receive the bolts, which carry the taper pin, and the securing devices. The shank of the taper pin A, extends through the slot J', and is provided with a head or nut $a$, and a flange or washer $a'$. At its opposite end, it is provided with a nut C, and a washer D. A split bushing B, surrounds the taper pin. It is cylindrical in shape and has a tapered bore corresponding with the contour of the pin A. The nut C and washer D, hold the bushing in place on the pin, which bears against the face of the frame J, as clearly shown in Fig. 4. By tightening the securing devices, the taper pin and the bushing may be securely fastened to the frame and the arrangement is such that the pin may be adjusted toward and from the axis of the face plate or the chuck to the desired degree.

The holder E, is provided with a shank extending through the slot J', and with a nut and washer E'. It has two arms $e\ e$ provided with set screws $e'\ e'$. The holder is adjustable toward and from the axis of the lathe, and the set screws are employed for securing the eccentric blank in position. A screw G, extends through one end of the frame J, and through the shank of the taper pin. By means of this screw, the taper pin may be adjusted in either direction relatively to the axis of the lathe, to provide for forming eccentrics of different throws. The exact "throw" of the eccentric may be determined by means of the scale K, shown in Fig. 4, and which is formed on the frame J. An indicating mark $k$ is formed on the taper pin, or the flange H, thereof, to determine accurately the form or throw of the eccentric to be turned. As shown in the drawings, the scale indicates two and five-eighths, and when thus adjusted, an eccentric with a five and one-fourth inch throw will be formed. The eccentric blank L, is shown by dotted lines. It has a circular opening $l$, adapted to fit over the bushing B, and two openings $l'$ separated by a web $l^2$. The arms $e$ of the holder extend through the openings $l'$, and the set screws $e'$, are made to engage with the web $l^2$, as indicated in Fig. 3. When thus mounted, the eccentric blank is held firmly in place. The set screws hold it firmly at one point, while the bushing, which is expanded by the taper pin, holds it firmly at another point.

The construction of my improved lathe chuck is very simple, yet it holds the blank firmly in place and adjustments can readily be made to determine the form of eccentric to be turned to give it any desired throw. The washer D, is shown as provided with "centers" F corresponding to the different throws required. These centers receive the "center" in tail stock of lathes, by means of which the chuck is supported, and the work is kept from chattering while turning, although the same work can be accomplished without using the tail stock. The screw G, may be omitted and the taper pin set by simply adjusting the nut $a$. I may also employ a taper pin H', extending through the flange H, and frame J.

I claim as my invention—

1. A lathe chuck comprising a frame, a holder, an adjustable taper pin, and an expansible bushing mounted thereon.

2. A lathe chuck comprising a frame, an adjustable taper pin, an expansible bushing mounted thereon, and an adjustable holder also mounted on the frame.

3. A lathe chuck comprising a slotted frame, a taper pin adjustably secured to the slotted frame, a split bushing mounted on the taper pin, a screw for adjusting the taper pin toward and from the axis of the chuck, and an adjustable holder carrying set screws for attaching it to the eccentric blank.

4. A lathe chuck comprising a slotted frame, an adjustable holder having arms provided with set screws for attachment to an eccentric blank, a taper pin having a shank extending through a slot in the frame, a screw for adjusting the taper pin, a split bushing mounted on the taper pin, and means for holding the bushing in place.

In testimony whereof I have hereunto subscribed my name.

JAMES R. HOWGATE.

Witnesses:
GEO. W. FEATHERSTONHAUGH,
F. L. SAUTER.